July 26, 1932. E. W. PRECOURT 1,869,276
ADVERTISING DEVICE
Filed April 11, 1932 2 Sheets-Sheet 1
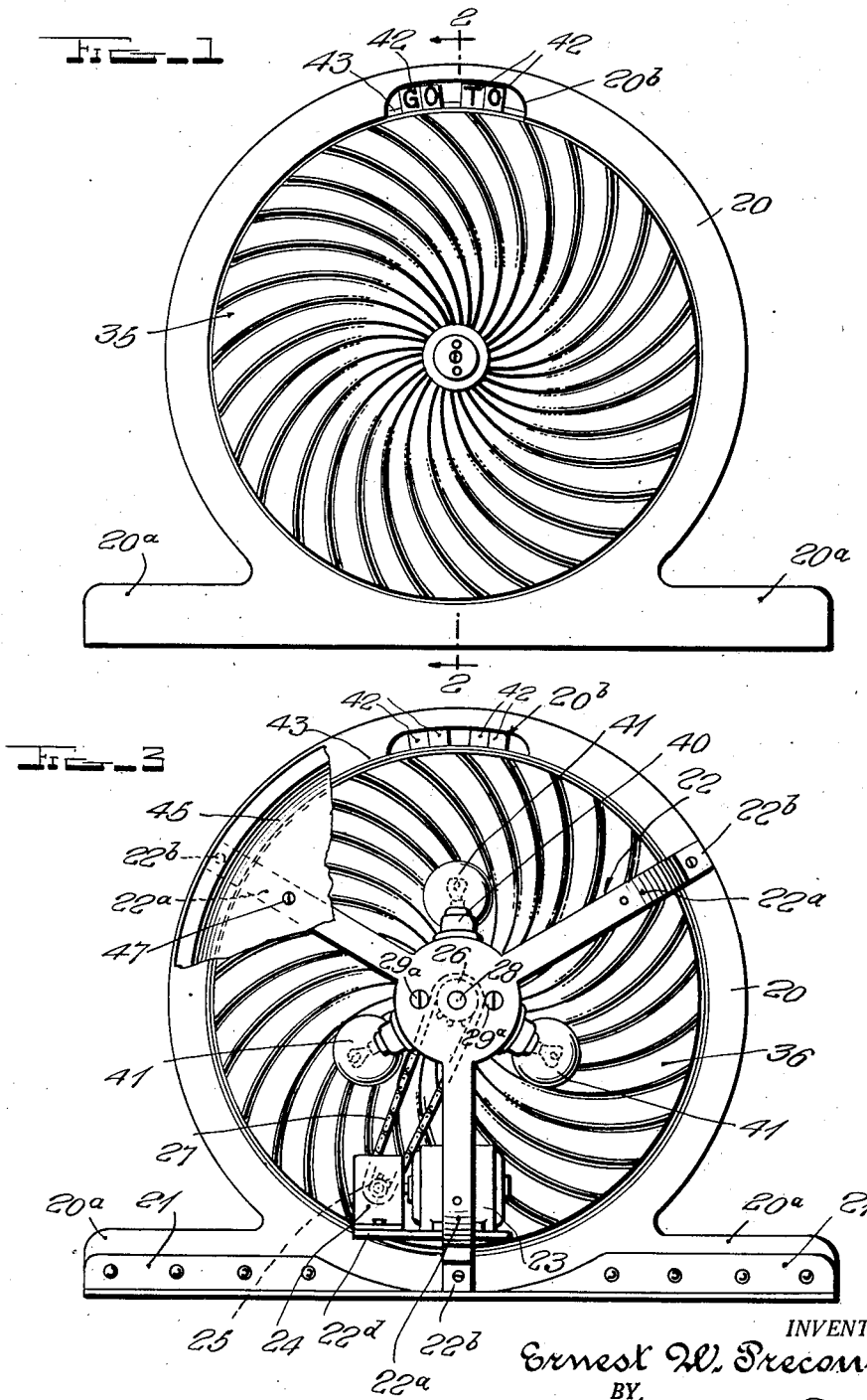

July 26, 1932. E. W. PRECOURT 1,869,276
ADVERTISING DEVICE
Filed April 11, 1932 2 Sheets-Sheet 2
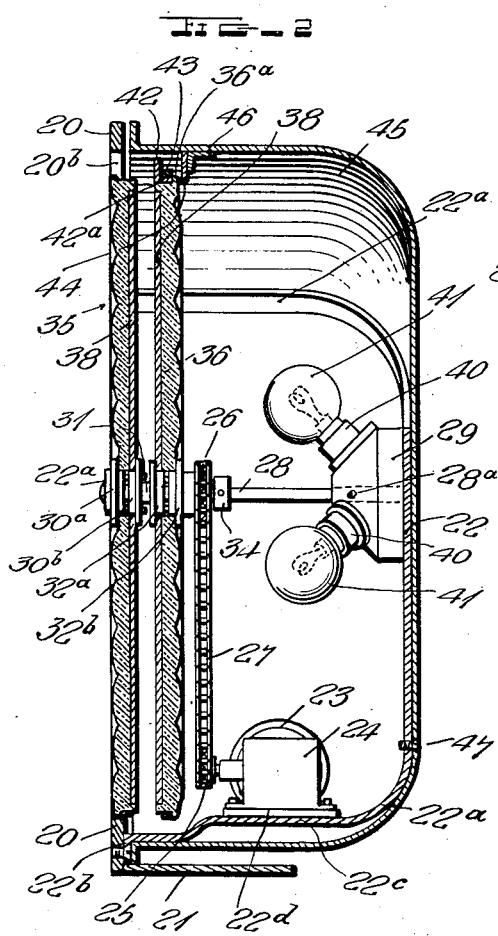
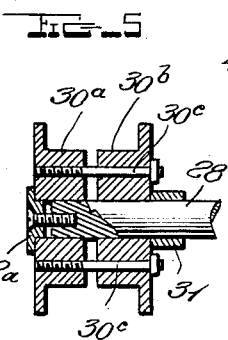
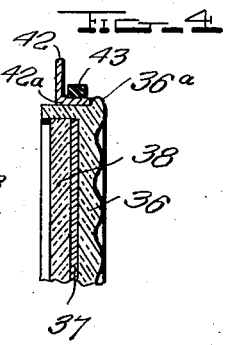
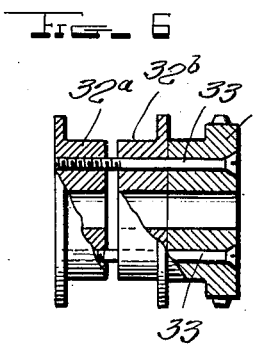
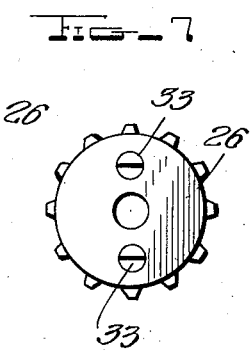
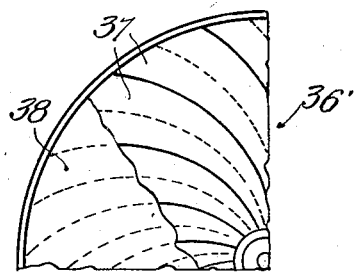
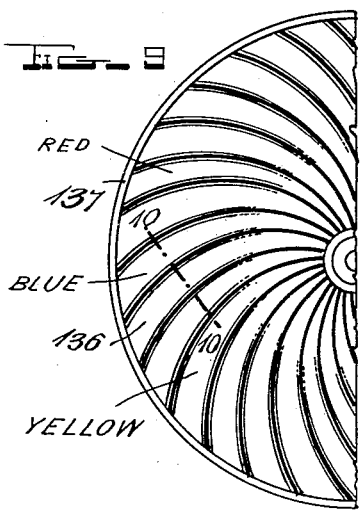
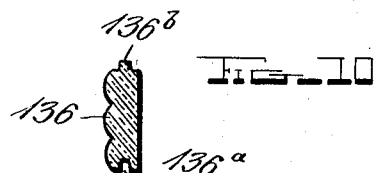
INVENTOR.
Ernest W. Precourt,
BY
Walter W Burns
ATTORNEY Patented July 26, 1932

1,869,276

UNITED STATES PATENT OFFICE

ERNEST WALTER PRECOURT, OF PHILLIPSBURG, NEW JERSEY

ADVERTISING DEVICE

Application filed April 11, 1932. Serial No. 604,568.

This invention relates to advertising devices and particularly to that type which attracts attention by means of an optically pleasing device.

In advertising devices there are two missions to be performed. First, there must be some feature which will attract the eye of the passer-by and second, there must be present words or signs which will convey the message of the advertisement.

The primary object of this invention is to provide an advertising device which will by means of transmitted light combine colors to produce color combinations which will be pleasing to the eye.

Another object of the invention is the provision of an advertising device having a plurality of disks of plain glass with spiral flutings radially placed.

Still another object of the invention is the provision of an advertising device having relatively moving disks of fluted disks, the flutes being arranged to increase in width from the center outwardly.

A still further object of the invention is the provision of an advertising device having relatively movable disks for the transmission of light, the disks having flutings radially arranged in spiral formations, the flutings increasing in width from the center outwardly and having means for making selected colored lights pass through desired sections of the flutings.

Other and further objects of the invention will be apparent from a reading of the complete specification and claims.

Referring to the drawings wherein I have illustrated an embodiment of my invention.

Figure 1 is a front view of my invention.

Figure 2 is a vertical sectional view on the line 2—2 of Figure 1.

Figure 3 is a rear view of the invention with the rear cover or pan cut away.

Figure 4 is an enlarged view of a portion of one of the disks.

Figures 5 to 7, inclusive, are enlarged detail views.

Figure 8 is a detail view of the translucent members showing one way of arranging the color sheet relative to the fluted and plain translucent members.

Figure 9 is a face view of a modified form of the invention.

Figure 10 is a cross section on the line 10—10 of Figure 9.

Similar reference characters refer to the same or similar parts throughout the specification and drawings.

Referring particularly to Figures 1, 2 and 3, 20 designates the main front supporting frame, 21 the angular base supporting member which is secured to the extensions 20ª of the main front supporting frame 20.

A spider shaped rear frame 22 has three legs 22ª spaced at 120° apart and each having a foot member 22ᵇ which is suitably secured to the main frame 20. The lower leg 22ª has an offset 22ᶜ which is provided with a platform 22ᵈ. This platform provides a support for the motor 23 and its reduction speed gear box 24. At the side of the reduction speed gear box 24 and connected to the gearing within the box 24, is a sprocket 25 which is connected to a sprocket 26 by a chain 27.

The sprocket 26 is mounted on the axle 28.

Mounted on the spider 22 at its center is a block 29 which is held in place by suitable screws 29ª. This block is provided with a center hole which receives the axle 28, which latter is held in place by the set screw 28ª. The opposite end of the axle 28 is secured in a double collar-clamp having similarly constructed members 30ª, 30ᵇ which are held in proper relation by clamping bolts 30ᶜ. The collar-clamp 30ª, 30ᵇ is supported by and in one of the translucent members to be presently described. A cap member 22ª is secured by a screw to the shaft 22 to hold the shaft and collar-clamp 30ª, 30ᵇ in proper relation.

Adjacent the collar-clamp 30ª, 30ᵇ, is a separating collar 31 which prevents contact between the collar-clamp 30ª, 30ᵇ and a similar construction having clamp members 32ª, 32ᵇ which with the sprocket member 26 revolve as a unit about the axle member 22. The clamp members 32ª and 32ᵇ and the sprocket member 26 are all suitably secured together as by the bolts 33. A locking collar 34 secured to the shaft 22 by its set screw, prevents endwise movement of the clamp members 32ª, 32ᵇ and the sprocket member 26 while they rotate as will be later described.

In carrying out my invention, I employ two relatively rotatable translucent members which broadly speaking have flutings in a surface, and through different sections of the fluted portions, different colored lights are passed.

With the two members each transmitting colored lights at different portions of their areas, the colors are made to combine to form and transmit other colors with a very pleasing effect upon the eye.

The outer translucent member 35 is shown in the drawings, though not necessarily, as being stationary, this translucent member having at its center the clamp members 32ª, 32ᵇ as already described. The relative rotation between the two translucent members is obtained by mounting the inner translucent member 36 on the collar-clamp members 32ª, 32ᵇ which as already stated, rotate with the sprocket wheel 26.

From the above description it will be clear that when the motor 23 is operated, the gearing within the box 24 will operate the sprocket 25 which through the chain 27 will operate the sprocket 26 and rotate the translucent member 36.

In the illustrated embodiment the two translucent members 36 are similarly constructed. This similarity may or may not be followed. However, such a construction is economical and when the fluted sides are placed away from each other, the effect is an opposite one when the flutings are arranged spirally. In the present instance, the width of the fluting increases outwardly from the center.

It has been found very desirable and pleasing to have portions of the flutings in each translucent member, so arranged as to transmit various colors. In the present embodiment, instead of making the translucent members of sections of different colors, each translucent member is made of one piece and has a sheet on the side of the translucent member, opposite to the flutings. This sheet I have designated by the reference character 37. The sheet 37 may be translucent paint which may be used to follow the lines between flutings, one or more adjacent flutings being of one color and another fluting may be of another color. Or if desired, the sheet may be made up of sections of a cellulose compound or of any other suitable material. The different sections may be of different colors. The lines marking the edges of adjacent sections may or may not follow the lines between the flutings of the translucent members.

If more or less loose sheets are used to furnish the color, another plain translucent member 38 is provided to fit as shown in Figure 4 in a recess in the translucent fluted member. The clamp members 30ª, 30ᵇ hold the assembly of light-transmitting translucent members in position and in proper relation to each other.

In order to provide illumination for the fluted members I provide electric light sockets on the block 29. These are preferably so placed as to tilt somewhat forwardly, as illustrated in Figure 2. These sockets are described by the reference character 40, the lamps for the socket being designated by the reference character 41. Suitable electrical connections for the supply of electric current for the lamp 41 and also to the motor 23 have been omitted in details since these connections are well known in the art, and per se form no part of the present invention.

Referring particularly to Figures 1 and 2, attention is called to the fact that the main frame 20 has a cutaway portion adjacent its top which I have designated 20ᵇ. On the periphery of the fluted member 36 will be observed a bead 36ª. This is clearly illustrated in Figure 4. In order to provide words or signs for the advertisement, I have provided small letters which I have designated 42 which have a vertical portion which is the letter or sign and an angular portion 42ª which is designated to fit the periphery of the fluted member 36 adjacent to the bead 36ª.

A rubber band or other suitable retaining means 43 is provided on the periphery of the rotating member 36 and under this rubber band 43 is placed the angular portion 42ª of the advertising device 42.

By properly spacing the advertising devices 42, the advertising message is conveyed through the opening 20ᵇ already described. The bead 36ª has a tendency to assist in holding the advertising devices in place. At the back of the advertising devices is placed a suitable piece of frosted glass 44 which is secured to the cover or pan member 45 by a bracket member 46. The cover or pan member 45 is secured in place by a suitable screw 47 of which there may be three, one connecting the cover to each leg or spider.

Inspection of Figure 2 will show that the cover member 45 is spaced from the main frame member 20, a distance equal to the thickness of the foot member 22ᵇ as already described. This provides an air space to permit the circulation of air with the outside atmosphere which prevents overheating of the device due to the heat from the electric lamps 41 and the motor 23.

In Figures 9 and 10, I have illustrated a modified form of my device wherein segments are provided of different colored glass. In this case glass may be cast having any desired number of flutings of a color and the different colored sections placed together to form one complete relatively rotating translucent member. As illustrated in Figure 9, I have shown three flutings to the section.

These sections are designated by the reference character 136. In order to hold the sections together, I may provide, on the sections grooves 136ª and tongues 136ᵇ for cooperation with adjacent sections. In order to hold the sections in proper relation, at the periphery I may provide a band of metal 137 which serves to keep the assembly together. In this construction, the operation is the same as the preferred embodiment with the exception that in the assembly operation, no coating or sheet of color material is needed as the color is placed in the glass itself during the manufacture.

The number of segments for the complete rotating member and the number of flutings in each section may be varied to suit the tastes of the manufacturers or users.

It will be understood that the several members through which light is to be transmitted may be made of glass or of any of the suitable cellulose materials or any other suitable material.

While I have shown and described in detail embodiments of my invention, I desire to have it understood that these are merely illustrative and that modifications and changes may be made without departing from the spirit of the invention and within the scope of the appended claims.

Having described my invention what I claim and desire to secure by Letters Patent is:—

1. An advertising device comprising a plurality of relatively rotatable translucent members having flutings thereon and means for providing light for the flutings.

2. An advertising device comprising a plurality of relatively rotatable translucent members having radially extending flutings thereon and means for providing light for the flutings.

3. An advertising device comprising a plurality of relatively rotatable translucent members having flutings thereon, the flutings having variable widths at different portions of their length and means for providing light for the flutings.

4. An advertising device comprising a plurality of relatively rotatable translucent members having radially extending spiral flutings and means for providing light for the flutings.

5. An advertising device comprising a plurality of relatively rotatable translucent members having radially extending spiral flutings, the flutings increasing in width from the center outwardly and means for providing light for the flutings.

6. An advertising device comprising a plurality of relatively rotatable translucent members having flutings thereon and message conveying means secured to one of the relatively rotatable members.

7. An advertising device comprising a plurality of relatively rotatable translucent members having flutings thereon, message conveying means secured to one of the relatively rotatable members and screening means in position to obscure the message conveying means during part of the relatively revolving movement.

8. An advertising device comprising a plurality of relatively rotatable translucent disks having flutings thereon, message conveying means at the periphery of one disk and means for securing the message conveying means in place.

9. An advertising device comprising a plurality of relatively rotatable translucent disks having flutings thereon, message conveying means at the periphery of one disk, means for securing the message conveying means in place and screening means in position to obscure the message conveying means during part of the relatively revolving movement.

10. An advertising device comprising a plurality of relatively rotatable translucent members having flutings thereon, a space on one of the members for receiving color sheets and means for providing light for the flutings.

11. An advertising device comprising a plurality of relatively rotatable translucent members having flutings, portions of the flutings of each rotatable member having color means for the transmission of lights of different color and means for providing light for the flutings.

12. An advertising device comprising a plurality of relatively rotatable translucent clear members having flutings thereon, a recess on the rear of each member to receive a color sheet and a sheet of clear translucent material for holding the color sheet in place adjacent the surface of the fluted members.

13. An advertising device comprising a plurality of translucent disks having flutings thereon, means for holding one of the disks stationary and power means for rotating the other disk and relatively stationary light producing means in position to deliver light through the translucent means.

14. An advertising device comprising a plurality of relatively rotatable translucent clear members having flutings thereon, the flutings being spirally arranged from the center outwardly and increasing in width from the center outwardly, recesses in one side of the fluted members, color sheets in the recesses, clear sheets of translucent material for holding the color sheets in place and relatively stationary light emitting means for providing light for the color sheet and the flutings.

15. An advertising device comprising a plurality of relatively rotatable translucent members, each relatively rotatable member having sectors of variously colored fluted translucent material and lighting means for illuminating the translucent material.

16. An advertising device comprising a plurality of relatively rotatable translucent members each relatively rotatable member having spiral sectors of variously colored fluted translucent material with locking means between adjacent sectors.

In testimony whereof, I hereunto affix my signature.

ERNEST WALTER PRECOURT.